Sept. 3, 1963  R. A. TIEDEMANN  3,102,619

MECHANICAL LOCK, BRAKE AND COUPLING APPARATUS

Filed Sept. 8, 1961

INVENTOR.
RICHARD A. TIEDEMANN
BY
ANDRUS & STARKE
ATTORNEYS.

United States Patent Office 3,102,619
Patented Sept. 3, 1963

3,102,619
MECHANICAL LOCK, BRAKE AND COUPLING APPARATUS
Richard A. Tiedemann, Milwaukee, Wis., assignor to A. O. Smith Corporation, Milwaukee, Wis., a corporation of New York
Filed Sept. 8, 1961, Ser. No. 136,939
7 Claims. (Cl. 192—8)

This invention relates to a brake and coupling apparatus and particularly to such an apparatus having a rotatable motion transfer shaft which can be readily turned in either direction from one end and which is positively locked against rotation in either direction from the opposite end.

The coupling for this invention is particularly adapted as an input control of a transformer having a movable core or coil for adjusting the current or voltage output. For example, in the copending application of William D. Hoffmann entitled, Mechanical Coupling which was filed on April 10, 1961 with Serial No. 101,707 and which is assigned to a common assignee herewith, an arc welding transformer is shown having a movable primary coil or winding for adjusting the output current. In a transformer supplying a load, the electromagnetic effect between the primary and the secondary winding creates forces tending to separate the windings. Where one of the windings is fixedly mounted and the opposite winding is movably mounted, the entire force is applied to and tends to move the movably mounted winding. The torque applied on the positioning control of the movable coil must be overcome in order to hold the windings in the proper relationship. The previously referred to application discloses a one-way braking system permitting ready movement of a lead screw in either direction from the input side of a coupling while braking the device against movement when the torque is applied to the output side of the coupling. Although the mechanical coupling shown therein provides a completely satisfactory operating unit, it has been found that under certain operating conditions and use of the transformer that it would also be desirable to prevent movement of the coupling in either direction when the torque is applied to the output side of the device.

The present invention is particularly directed to a simple inexpensive apparatus establishing a two-way lock against the rotation of the transfer element or shaft when the force is applied at one end while allowing free rotation in either direction when the force is applied from the opposite end of the coupling.

Generally, the present invention includes a transfer shaft adapted to transmit a controlled input movement to a load such as the lead screw of a movable coil transformer. A pair of releasably engaged locking members is secured one each to the shaft and to a suitable relatively stationary support. The locking members are relatively movable to a released position. An input member is rotatably secured to the transfer shaft and is provided with oppositely acting cam surfaces. Depending upon the direction of rotation of the input member, one or the other cam surfaces engages one of the locking members and moves it with respect to the other locking member to effect disengagement therebetween and to allow rotation of the input member and the transfer shaft as a unit. If a torque is applied to the opposite end of the shaft however, the locking members positively prevent rotation in either direction.

The drawing furnished herewith illustrates the best mode presently contemplated for carrying out the invention.

In the drawing:
FIG. 1 is a side elevational view of an arc welding transformer of the movable coil design including a brake and coupling apparatus constructed in accordance with the present invention;

Figure 1:
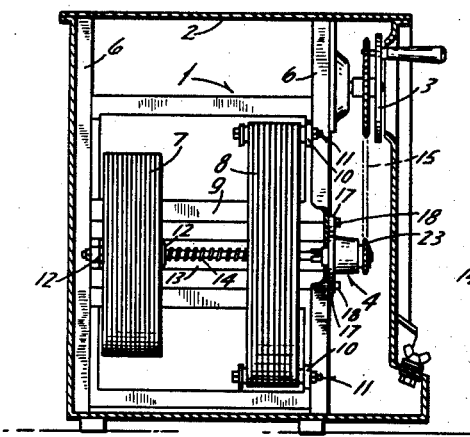

Referring to the drawing and particularly to FIG. 1, an arc welding transformer 1 is diagrammatically shown mounted within a suitable housing 2. A current control hand wheel 3 is mounted adjacent the front wall of the housing 2 and connected through a mechanical brake and coupling 4 to control the current setting of the arc welding transformer 1.

The illustrated transformer 1 includes a three-legged magnetic core structure 5 having the legs stacked in vertically spaced relation and joined by magnetic end core portions. Upright mounting frames 6 are secured within the housing and to the end core portions of magnetic core 5 to rigidly support the core within the housing 2. A primary winding 7 and a secondary winding 8 are concentrically wound upon the central leg 9 of the core 5 within the housing 2. Mounting brackets 10 are formed on the forwardmost upright frame 6 and are secured to the secondary winding 8 to fixedly secure the secondary winding immediately adjacent the forward wall of the housing 2 as by nut and bolt units 11.

The outer diameter of the primary winding 7 is generally slightly smaller than the internal diameter of the secondary winding 8. The primary winding 7 is thus adapted to be moved into the secondary winding 8 adjacent the front of housing 2 for maximum magnetic coupling therebetween and to be moved rearwardly on the central core leg 9, in spaced relation to the secondary winding 8, to decrease the magnetic coupling and thereby reduce the output relationship.

A pair of oppositely disposed bearing members 12 are fixedly secured to the central side portions on the front and back of the primary winding 7 generally in vertical alignment with the central leg 9. Bearing members 12 extend into suitable slideways 13 provided on the central leg 9 of the core 5 and slidably support the primary winding 7 for movement with respect to the secondary winding 8.

A lead screw 14 is journaled in the upright mounting frames 6 and passes through a suitable opening in the central leg 9 of the core 5. A lead nut, not shown, is threaded onto the lead screw 14 and connected in any suitable manner to the bearing members 12. Consequently, rotation of the lead screw 14 results in threading of the nut, not shown, longitudinally of the lead screw with corresponding positioning of the primary winding 7.

The coupling 4 is secured to the forward end of the lead screw 14 and is connected to the hand wheel 3 by a chain and sprocket drive 15 to allow manual rotation of the lead screw and corresponding positioning of the primary winding 7.

Figure 2:
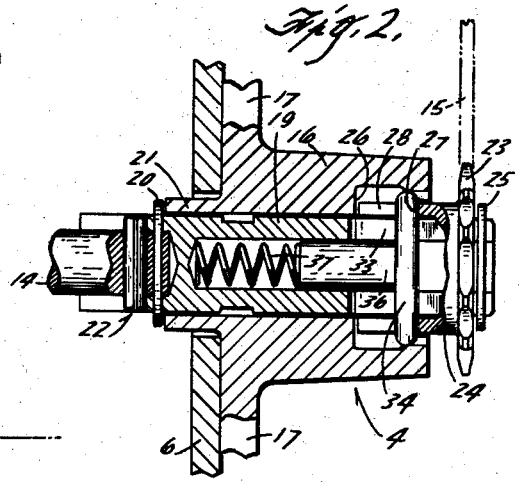
FIG. 2 is a longitudinal sectional view through the brake and coupling apparatus shown in FIG. 1.
Figure 3:
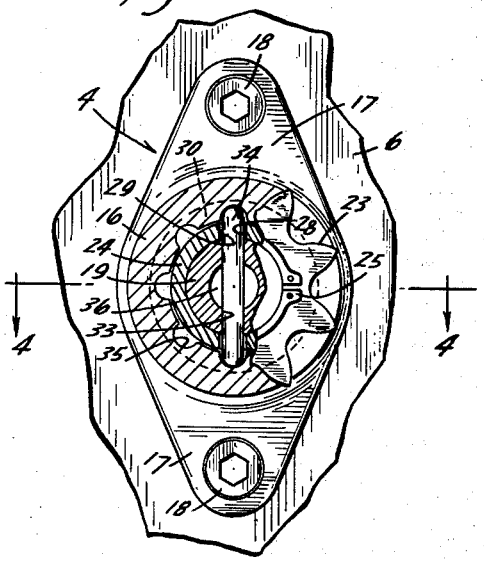
FIG. 3 is a front elevational view of the brake and coupling apparatus with parts broken away and sectioned.
Figure 4:
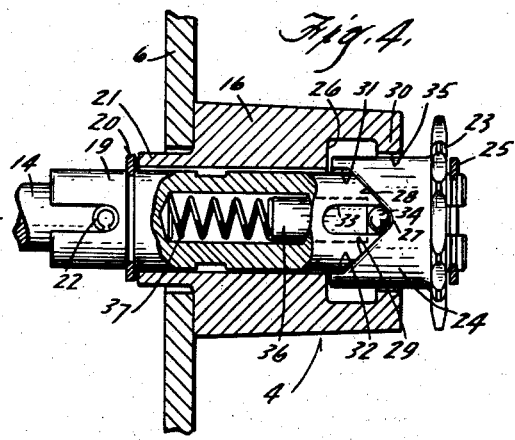
FIG. 4 is a top elevational view of the apparatus shown in FIG. 2 with parts broken away and sectioned to show details of construction.

Referring particularly to FIGS. 2–4, the brake and coupling 4 of the present invention is illustrated including a housing 16 having integral mounting flanges 17 projecting laterally thereof. Suitable bolts 18 pass through the flanges 17 and secure the bearing shaft and housing 16 to the mounting frame 6, as shown in FIG. 1. A shaft 19 is journaled within a corresponding longitudinal opening in the housing 16 and extends axially from the opposite ends thereof. A locking ring 20 encircles the shaft 19 at the output end of the brake and coupling 4 and abuts an integral hub 21 of the housing 16. The locking ring 20 positively prevents pulling of the shaft 19 forwardly through the housing 16.

A pin and lock connection 22 interconnects the output end of the shaft 19 to the adjacent end of the lead screw 14 to transmit rotation of the transfer shaft 19 to the lead screw 14. Rotation of shaft 19 thereby establishes positioning of the primary winding 7 with respect to the secondary winding 8.

A sprocket 23 forming a part of chain and sprocket drive 15 includes a central cam hub 24 rotatably journaled on the input end of the shaft 19. A locking ring 25 encircles the shaft 19 immediately adjacent the input end and holds the sprocket 23 on the shaft. The cam hub 24 projects into the adjacent or forward end of the housing 16 which is suitably counterbored to define a locating shoulder 26 for proper locating of the cam hub 24 with respect to the forward wall of the housing.

As most clearly shown in FIG. 4, the cam hub 24 includes a pair of diametrically opposed V-shaped openings or slots on the innermost edge or inner end of the cam hub. Each of the V-shaped slots includes a base joint or junction 27 from which diverging cam surfaces or edges 28 and 29 extend axially and circumferentially of the cam hub. The base junction 27 is aligned with a forward wall 30 of the housing 16 with the cam surfaces 28 and 29 diverging inwardly of the housing 16 and terminating in axially extending drive surfaces 31 and 32.

An axially extending slot 33 is machined or otherwise formed in the input end of shaft 19 and extends inwardly of housing 16 beyond the normal position of the cam hub 24. The slot 33 is aligned with the V-shaped slots in the cam hub 24 and accommodates a locking and coupling pin 34 which projects diametrically therethrough. The pin 34 extends outwardly of the cam hub 24 within the housing 16. The forward wall 30 is an inwardly projecting flange integrally formed with the outer wall of the housing 16 and having a series of diametrically opposed pairs of detents 35 on the inner circumference thereof for accommodating the opposite ends of pin 34, as hereinafter described.

The pin 34 is biased into the cam slot in hub 24, as follows. The shaft 19 is provided with a central recess or bore which projects inwardly of the slot 33. A rod or plunger 36 is slidably disposed within the bore and a coil spring 37 is mounted between the base of the bore of shaft 19 and the inner end of the plunger 36. The coil spring 37 continuously and resiliently urges the plunger 36 outwardly into biasing engagement with the central portion of the pin 34. In this manner the pin 34 is biased outwardly and held within the V-shaped openings defined by the cam surfaces 28 and 29.

As previously noted, the base or junction 27 of the cam surfaces 28 and 29 is aligned with the forward wall 30 of the housing 16. In the absence of application of torque to the sprocket 23, the pin 34 is consequently held within the junction 27 of cam surfaces 28 and 29 and in alignment with the forward wall of the housing 16.

The ends of the locking and coupling pin 34 mate with a pair of diametrically opposed detents 35 and held against rotation about the axis of the shaft 19. The pin 34 is also coupled to the slot 33 in shaft 19 and forms a brake or locking member which prevents rotation of the shaft 19. A torque applied to the shaft 19 from the lead screw 14 is therefore transmitted to the pin 34 and then to housing 16.

In contrast, application of torque to the sprocket 23 is first effective to rotate the sprocket and the attached cam hub 24 relative to the shaft 19 and the locking and coupling pin 34. During the rotation of the hub 24, the cam surface 28, or 29, depending upon the direction of sprocket rotation forces the pin 34 to move axially inwardly from the forward wall 30 and the detents 35 until the pin is aligned with the corresponding drive surface 31 or 32 within the counterbored portion of housing 16 wherein the pin 34 is free to rotate. Thereafter, continued rotation of the sprocket 23 is transmitted to shaft 19 through the pin 34 and the shaft 19 is correspondingly rotated. In this manner, the lead screw 14 which is coupled to shaft 19 can be rotated in either direction for the positioning of the primary winding 7.

Upon release of the application of torque to the sprocket 23, the plunger 36 is forced outwardly by the coil spring 37 and returns the pin 34 to the base junction 27 of the cam surfaces 28 and 29. The ends of the pin 34 are then again disposed within a pair of diametrically opposed detents 35 to again lock the shaft 19 against rotation.

The plurality of opposed detents 35 are selected to assure that the pin 34 is always returned into locking engagement with a pair of closely adjacent detents 35.

The present invention thus provides a brake and coupling apparatus effective to block transfer of motion from one side to the other and thereby preventing the input motion while permitting ready and easy movement from the opposite side. As previously noted, this invention is particularly adapted for preventing creep of a movable coil in a welding transformer wherein the movement forces are established during the operation of the controlled apparatus.

Various modes of carrying out the invention are contemplated as being within the scope of the following claims particularly pointing out and distinctly claiming the subject matter which is regarded as the invention.

I claim:

1. In a brake and coupling unit, a transfer shaft, a support, a pair of locking members secured one each to said shaft and to said support, the locking member axially slidable with respect to said shaft to enable disengagement from the opposite locking member, and an input member rotatably mounted on said shaft and having oppositely acting cam surfaces engaging the locking member on the shaft to disengage the locking members in response to either direction of rotation of the input member and to transmit the continued rotation of the input member to the shaft.

2. In a brake and coupling unit, a housing, a transfer shaft journaled within the housing, a locking member axially slidably secured to the shaft, latch means on the housing for engaging the locking member in a predetermined axial position of the locking member, an input member rotatably secured to the shaft and having oppositely active cam surfaces aligned with the locking member and drive surfaces adjacent the terminal end of the cam surfaces, and means resiliently urging the locking member into engagement with the cam surfaces and in engagement with the latch means in the absence of an input torque on said input member.

3. In a brake and coupling unit, a housing, a transfer shaft journaled within the housing, a locking member axially slidably mounted on the shaft and rotatable therewith, latch means on the housing for engaging the locking member in a predetermined axial position of the locking member to prevent rotation of the shaft, an input member rotatably mounted on the shaft and having oppositely active cam surfaces disposed to opposite sides of the locking member and having a common junction aligned with the latch means, said cam surfaces terminating in axially extending drive surfaces, and a spring-loaded member slidably disposed on the shaft and engaging the locking member to resiliently urge the locking member against the cam surfaces.

4. In a brake and coupling unit, a bearing and supporting housing, a shaft journaled in the housing and extending axially outwardly thereof and constituting an input shaft end and an output shaft end, an input hub member rotatably mounted on the input end of the shaft, said hub member projecting into the adjacent end of the housing and having diametrically opposed cam slots on the inner end of the hub defining cam surfaces with a common junction, said cam surfaces terminating in axially extending drive surfaces at the outermost portions of the slots, said shaft having a diametrical shaft slot, a pin slidably mounted in the shaft slot and projecting radially outwardly within the cam slots, resilient means connected to the pin and to the shaft and stressed to continuously urge the pin to one end of the slots, and a plurality of diametrically opposed detents in the housing in the plane of the common junctions of the cam slots to accommodate the ends of the pin and lock the shaft against rotation, rotation of said input hub member establishing cammed movement of the pin from alignment with the detents and into engagement with the drive surfaces on the hub to rotate the shaft in accordance with rotation of the input member.

5. In a brake and coupling unit, a bearing and supporting housing having an apertured forward wall, a shaft journaled in the housing and extending axially outwardly thereof and constituting an input shaft end and an output shaft end, means on the output end to restrict axial movement relative the housing, a sprocket having an integral cam hub rotatably disposed on the input end of the shaft, said cam hub projecting into the adjacent end of the housing and having diametrically spaced generally V-shaped slots on the inner end of the cam hub with the junction of the edges of the slots aligned with the forward wall of the housing and with axially extending drive edges at the outermost portion of the slots, said shaft being bored from the input end inwardly of the cam hub and having a radial slot on the input end, a pin slidably disposed within the radial slot and projecting radially outwardly within the V-shaped slots, a plunger in the shaft bore, a spring between the base of the bore and the plunger urging the plunger outwardly into resilient biasing engagement with the pin, and a plurality of diametrically opposed detents in the front wall of the housing to accommodate the ends of the pin and lock the shaft against rotation due to torque applied from the output end, rotation of said sprocket establishing cammed movement of the pin from alignment with the detents and engagement of the drive edges on the cam hub to rotate the shaft in accordance with rotation of the sprocket.

6. In a brake and coupling unit, a housing, a transfer shaft journaled within the housing, a locking member axially slidable with respect to said shaft and non-rotably connected to the shaft, latch means on the housing for engaging the locking member in a predetermined axial position of the locking member, an input member rotatably secured to the shaft and having a cam surface aligned with the locking member and terminating in a drive surface adjacent the terminal end of the cam surface, and means resiliently urging the locking member into engagement with the cam surfaces and latch means.

7. The construction of claim 6 wherein the input member is a cylinder rotatably mounted on the shaft having a slot with a circumferentially and radially extending portion and an axially extending portion defining the cam surfaces, and said locking member is a pin slidably secured to and projected radially of the shaft.

References Cited in the file of this patent
UNITED STATES PATENTS

| | | |
|---|---|---|
| 1,414,000 | Todd | Apr. 25, 1922 |
| 1,520,692 | Brennan | Dec. 30, 1924 |